Patented Oct. 16, 1951

2,571,754

UNITED STATES PATENT OFFICE 2,571,754

PROCESS OF PROLONGING THE LIFE OF
A STORAGE BATTERY

Fred Perkins, York, Pa.

No Drawing. Application July 17, 1950,
Serial No. 174,376

4 Claims. (Cl. 136—165)

My invention relates to storage batteries of the lead-acid type, and more particularly to a method of periodically deoxidizing (reducing) the excess peroxide (always present in a positive plate) in such a manner as to greatly prolong the life of the battery.

The subject matter of the present application, and any patent that issues therefrom, is hereby dedicated to the public.

One object of the invention is to provide a process by which the disintegration of the positive-plate grid is prevented, or, at least, retarded, thereby prolonging the life of these plates—and of the battery.

Another object is to so proportion the volume of the electrolyte (sulphuric acid) that it will permit a periodic deoxidization of the excess peroxide, after the strength of the acid has declined in normal discharge.

Generally stated, I prolong the life of a battery by two distinct principles. First, I provide a volume of acid that shall be no greater than actually required to regularly produce a given rating at a predetermined rate of discharge. Second, I provide that at periodic intervals, preferably every two months, a sufficient discharge be given to bring the voltage down to ½ volt per cell on a "dead-short."

Dr. George Wood Vinal states in his book, "Storage Batteries," 3rd edition, pages 216 and 217, that a cell will produce far greater capacity at a low discharge-rate in weak acid, than can possibly be attained by a higher discharge-rate in stronger acid. He also states on page 215 that any battery doing normal useful work, will show a capacity of three times the normal amount, where means can be provided for forcing the same electrolyte through negative plate (or plates) by gravity—instead of allowing it to remain at a constant level. He refers to the famous Liebenow experiment, which is purely a laboratory undertaking and could not possibly be realized in any commercial battery as actually made. Dr. Vinal does not give the discharge rate under which Liebenow made this laboratory experiment, but Dr. Eugene Willihnganz places it at a 2-hour rate. This statement can be found in an article prepared by him for the meeting of National Battery Manufacturers Association at White Sulphur Springs, in May of 1940. The title of his article is "The structure of sponge lead in the negative plate." Other authors claim that with a discharge rate considerably less rapid than the 2-hour rate, the stunt performed by Liebenow will show a discharge capacity of four times the value of a similar rated discharge in a battery as actually made.

It has been generally agreed by all authors that there is at all times an excess of peroxide amounting up to 75% of the total available peroxide in any positive plate. This can never be utilized for useful work except through a laboratory device such as set up by Liebenow. In a general way, it is known that a negative plate has many times the capacity of a positive plate (of same cubic volume), on a low rate of discharge. Also, it is known that on a high discharge rate (say a 6-hour rate) the capacity of the two plates is about the same.

It has always been the custom in the past for battery makers to aim at efficiency within the cells, with no seeming attempt being made to learn what force is present to eventually change the molecular (crystalline) structure of the positive grids—causing them to disintegrate long before the active peroxide material has been consumed. Regardless of how homogeneous these grids can be cast, they offer no resistance to the driving electro-chemical force that builds up in the excess (unused) peroxide. This force, unless periodically interrupted, changes the molecular structure of the grids that support the peroxide. If the Liebenow method could be applied periodically to a commercially-built battery, there would never be any disintegration of these grids. They would not be destroyed, for the reason that the excess peroxide would be reduced before it had a chance to do damage. The whole substance of my invention consists of a means of deoxidizing this excess of peroxide without the benefit of the Liebenow method. I do it by having a volume of acid so small, that at the end of the normal discharge period, I can force the gravity down to around 1100 by further discharge through a resistor. It is at about 1100 gravity that the negatives begin to pick up a great deal of additional capacity—provided the discharge rate is now reduced to a very low figure. By the simple artifice of running the voltage down, through a (preferably) water-barrel resistor, I finally arrive at a point where I can put a dead-short across the terminals. By leaving this "dead-short" on for an approximate 12 hours, I can accomplish the very thing that Liebenow succeeded in doing in regard to increasing the capacity of the battery. The only difference lies in the fact that he could do it under a heavy discharge and thus obtain useful work, while under my method (the only one that can be used in practice), I obtain no useful work while reducing the potentially malignant higher oxides to a lower form of oxide.

Dr. Vinal remarks on page 168 of his book that we will "always be in the dark as to what actually goes on at the positive and negative plates." While this is very true, yet in my 35 years of study, experiment and observation (of the lead-acid battery) I have come to recognize many characteristics that are not mentioned in books. As an exhibit, dealing with certain phases of my experience, I am attaching a copyrighted article that I published on March 15th of this year. In this article, I did for the first time make public the "rules for handling," that I had proved by experiment, during the past several years, to be both helpful and practical.

Only within the past year, have I ever given instructions to any firm to follow the rules that I now lay down to all firms. Attached to my copyrighted article is a news item issued by the "American Metal Market" which enumerates my instructions. Since my invention is purely a "process" I did not think it would be patentable. Recently, I have come to think of it in a different light, thus am now applying for patent. Also, I did not officially announce it until March 15th of this year.

Just recently I have learned that the manufacturers of batteries used in switchgear service, rate such batteries on the basis of their capacity at the end of 2 years (from time they were bought new). The standard capacity-rating for such a battery is based on a complete discharge to 1.75 volts per cell in just 1 minute of time. It is significant that the rating for such a rapid discharge is 20% higher at the end of 2 years than what it will produce at the end of the first few weeks. This phenomenon alone, bears out my theory that the change to higher oxides is a "cumulative" effect. And because it is cumulative, it obviates the necessity of deoxidizing these higher oxides oftener than, say, once every two months. It is also significant that a switchgear battery (which is never drawn down to a voltage of less than 1.75 volts per cell), reaches its zenith in effective power after the cumulative process has been going on for 2 years. And it is still further significant that in a thin-plate battery (like a car battery)—which is likewise never drawn down to extreme low voltage—the disintegration of the positive grids takes place progressively as the cumulative forces mount. In other words, the car battery disintegrates in about 2 years. The one and only reason that a switchgear battery will last longer, would seem to lie in the fact that the plates are very much thicker, thus requiring a longer time for molecular changes to reach the inner recesses of the grids.

It will be noted that my "instructions for handling" apply only to an industrial-truck battery. This battery requires a small volume of acid in order to conserve space, hence it is easy to get the gravity down to 1100. To enjoy similar benefits, a switchgear battery would have to be built in (glass) jars of proportionately small acid volume—rather than the large acid volume that has always been a great "talking point" (in sales work) in the past.

It just seems that a false tradition has grown up in regard to damage to a battery by discharging it below 1.75 volts per cell. This tradition, undoubtedly, stems from the fact that users would allow a discharged battery to stand idle until the sulphate crystals had expanded and very likely had ruined the plates. Vinal shows on page 220 that the porosity of a properly made positive plate runs to 55% of the actual space available for active material. Never can any harm be done to the positives if the entire peroxide-mass is reduced to a sulphate, provided these same plates are not allowed to stand idle beyond, say, 24 hours. The same reasoning can apply to the negatives, provided they are designed to properly balance the positives—this balancing depending upon the rate of discharge for which the battery is designed.

In the foregoing discussion I have outlined the principles I use in carrying out my new process. While they apply particularly to an industrial-truck battery (in which the negative plates are kept active through daily cycling), yet with certain modifications they can be used to lengthen the life of any lead-acid battery. For instance, a glass-jar cell, built with large acid volume, can be improved by my process—even though the full effect of it may be lessened through inability to bring the acid strength down to such a point as to completely deoxidize the excess peroxide (and higher oxides). As regards "higher oxides," Vinal clearly states that one school of thought holds to the theory that "higher oxides" do build up (see page 164). He does not even mention that such a phenomenon could account for the molecular change in the grids—and this is another reason why I claim to be the original discoverer of the source from which the damage to the grids originates. It clearly lies in the excess peroxide.

In my instructions I do state that where a battery has stood idle in a partly discharged condition (long enough for the negatives to become sulphated), the battery should first be given 1 or 2 heavy-discharge cycles before my process is applied. Or, where the electrolyte shows a muddy color, indicating that the positive plates have sulphated, the battery should be given a long slow charge until such time as the liquid becomes perfectly clear. "Sulphation" means the growth of sulphate crystals which constantly enlarge in size until they can be "desulphated" only with difficulty. For applying my process, I state in general terms that the battery should first be discharged in a normal manner until the characteristic voltage-drop occurs—indicating that the normal discharge has been completed. I then direct that the battery be further discharged, through some form of resistance, to the point where a dead-short can safely be placed across the terminals—and this "dead-short" should then be left on for about 12 hours. In any battery where the negatives were correctly proportioned to suit the needs of the positives, I have never once (in all my experience) been able to detect even the slightest amount of damage resulting from this complete discharge. Within my experience, the only way I have ever seen a negative plate injured, was through a succession of heavy discharges where these same plates were much too thin to meet the demands of the positives. Any battery thusly made would have only a short life.

In my "instructions for handling" (of industrial-truck batteries), I stress the necessity of giving an "equalizing charge" the day before the date selected for deoxidizing the positives. This assumes that the battery is normally cycled each day. Naturally, if the battery has been standing idle in a partly discharged condition, my rules would call for a "desulphating" treatment a day or two ahead of the "equalizing charge." For "deoxidizing," I take the battery when it comes in from its daily chore, place it on the charging rack (or leave it in the truck) and apply a resistance that will run it down rapidly to a sudden voltage-drop. As soon as the voltage-drop occurs, I apply a much lesser resistance (preferably with a water barrel) until the voltage gets so low that it is practical to put a "dead short" right across the terminals. As before explained, I leave this on for 12 hours, or at least until the voltage goes down to ½ volt per cell. I have now deoxidized the plates to presumably the same extent that Liebenow was able to do it in his laboratory stunt.

It is held by all authors that the theoretical wear on the positive plates comes about through strong gassing, and very little wear (if any) through normal discharge. I, therefore, instruct my users not to resort to "overcharging" any oftener than once a month. I explain to them that light gassing, accompanied by moderate heat, indicates a "full-charge" in a healthy battery. I also explain that if the acid has been made too strong, that it is simply impossible to fully charge the battery at any time, without inducing a terrific amount of heat and destructive wear on the plates.

In my copyrighted article (my exhibit) I refer to additional facts that bear out the merits of my invention. I enumerate various findings that helped me to substantiate the theory I was building up. I could have related how in my farm-lighting work, I would often remove several of the negatives in a battery that seemed way too big for the work it was performing—and how, by so doing, I invariably improved both the efficiency and the life of such a battery. I simply gave the remaining negatives more work to do and thereby kept them more active—which is a basic requirement in the proper care of any battery. My present claim is that through my invention, as discussed in this petition, I have opened up a brand new era for the usefulness of a constant-voltage battery, and by a single stroke I figure I have doubled the life of a motive power battery. The employement of a 1 to 1 ratio, of negative to positive thickness of plates, is a premise that must be impressed upon every potential purchaser of an industrial-truck battery. I have covered this feature very thoroughly in my copyrighted article, and I insert it here as one requisite upon which my invention rests. I have succeeded in preventing the disintegration of the positive-plate grids. It is the result of 35 years of effort.

I claim:

1. The process of treating a lead-acid storage type cell—comprising first discharging it at a reasonable rate to about 1125 gravity, immediately thereafter short-circuiting the cell in order to further discharge same until it is in a substantially completely discharged condition, and thereafter recharging the cell.

2. The process of claim 1, wherein the gravity is reduced in the first step to a range from 1100 to 1140.

3. The process of claim 1, wherein the discharging process of the first step is continued until the recuperative power of the cell is practically nil—and gravity has been reduced to about 1040.

4. The process of claim 1, whereby a desulphating process precedes the discharging and charging steps enumerated.

FRED PERKINS.

REFERENCES CITED

The following references are of record in the file of this patent:

UNITED STATES PATENTS

| Number | Name | Date |
|---|---|---|
| 949,506 | Tate | Feb. 15, 1910 |
| 1,034,887 | Deinlein | Aug. 6, 1912 |
| 2,451,087 | Hindall | Oct. 12, 1948 |

FOREIGN PATENTS

| Number | Country | Date |
|---|---|---|
| 19,111 | Great Britain | Aug. 19, 1909 |
| 334,393 | Great Britain | Sept. 4, 1930 |

OTHER REFERENCES

Perkins, "Batteries and Their Care," 1934, published by Perkins Battery Co., York, Pa.